May 13, 1969 C. O. SIEBKE 3,443,808

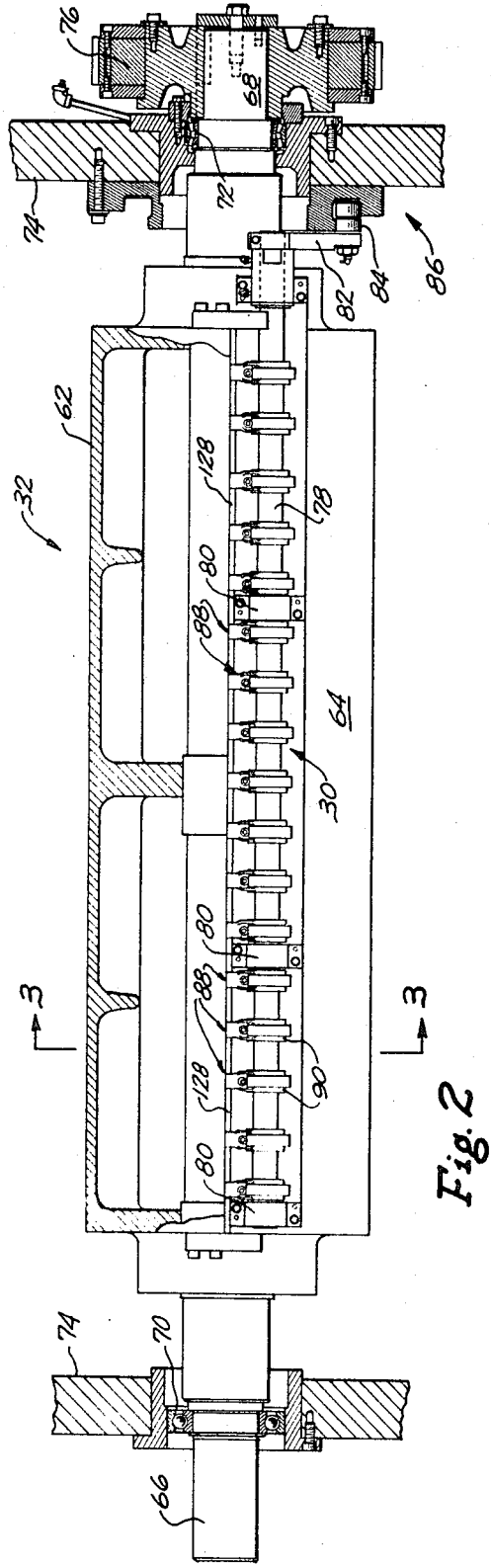
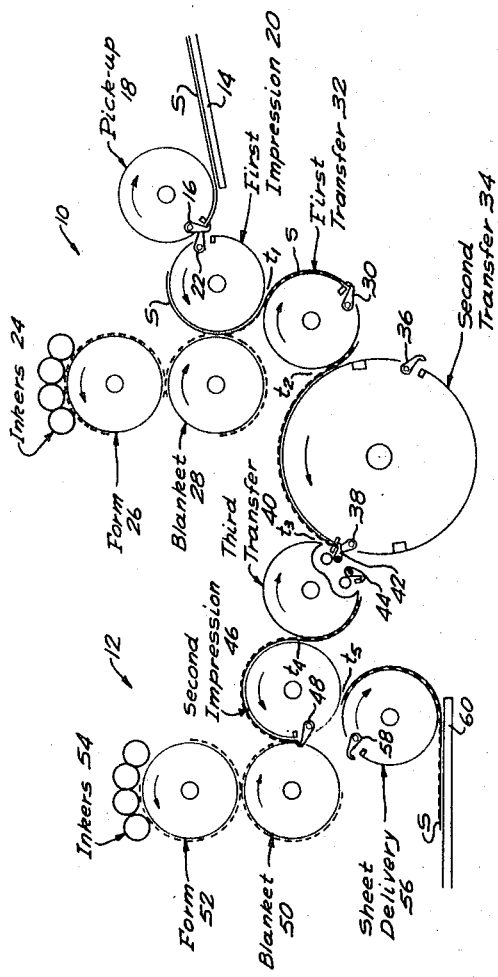
Fig. 2
Fig. 1
INVENTOR
CARL O. SIEBKE
BY Stanley J Price
his ATTORNEY

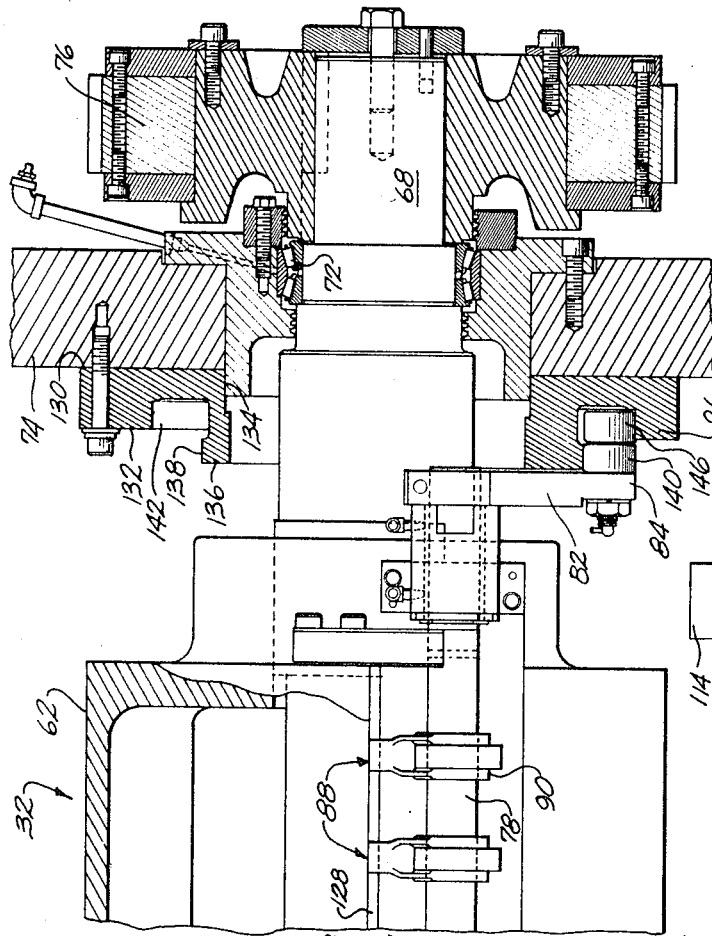
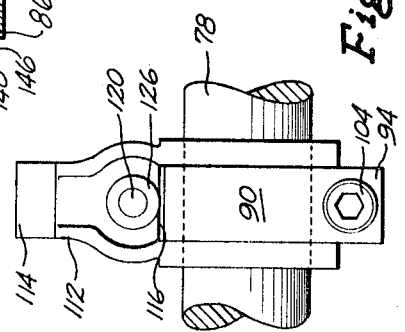
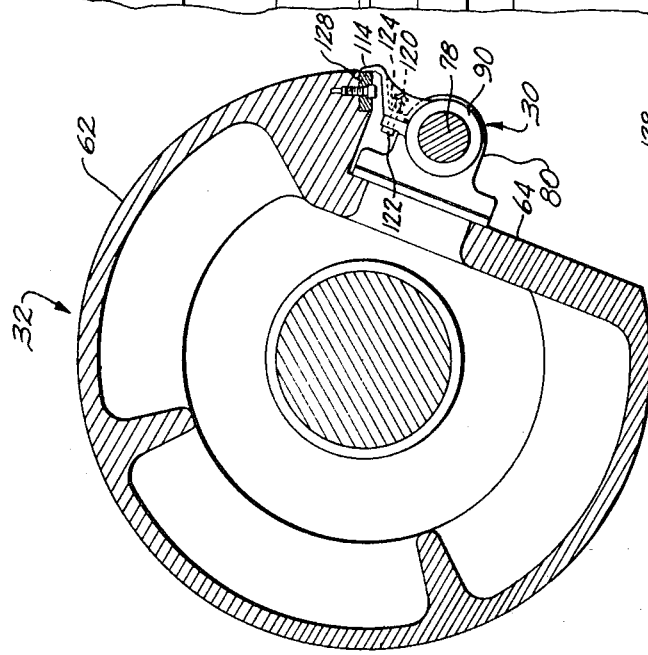
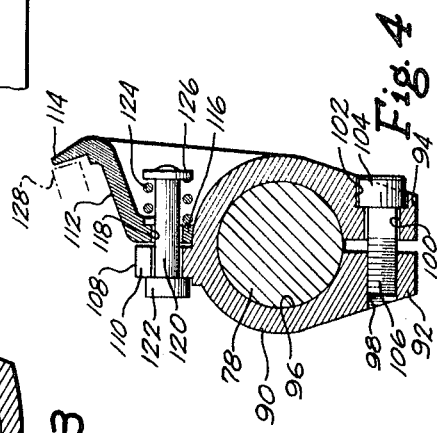

SHEET GRIPPER MECHANISM

Filed May 5, 1967 Sheet 3 of 3

INVENTOR
CARL O. SIEBKE
BY Stanley J Price
his ATTORNEY

United States Patent Office 3,443,808
Patented May 13, 1969

3,443,808
SHEET GRIPPER MECHANISM
Carl O. Siebke, Pittsburgh, Pa., assignor to Miller Printing Machinery Co., Pittsburgh, Pa., a corporation of Pennsylvania
Filed May 5, 1967, Ser. No. 636,389
Int. Cl. B65h 29/06
U.S. Cl. 271—82                                        10 Claims

ABSTRACT OF THE DISCLOSURE

A positive drive cam actuated gripper mechanism and apparatus for adjusting the pressure or clamping force of the gripper fingers on the gripper pads. The cam member includes an adjustable portion on the surface where the cam member through the cam follower urges the gripper mechanism toward a closed position. The adjustable portion of the cam surface is moved to a position where the gripper fingers are spaced a preselected distance from the gripper pads. The gripper fingers are each rotated on the actuator shaft toward the gripper pads so that a preselected spacing remains between the gripper finger and the gripper pad. After adjustment of the gripper fingers, the adjustable portion of the cam surface is moved to a position where under normal operating conditions the gripper fingers are in a closed position abutting the gripper pads. A spring associated with the gripper fingers after adjustment provides a preselected clamping force between the gripper fingers and the gripper pads in the normally closed position of the gripper mechanism. There is provided a positive drive cam follower that has two rollers that ride on opposed surfaces of the groove in the cam face.

BACKGROUND OF THE INVENTION

Field of the invention

This invention relates to a cam actuated gripper mechanism and more particularly to apparatus for adjusting the clamping force of a cam actuated gripper mechanism.

Description of the prior art

Gripper mechanisms for the sheet carrying members, particularly high speed printing presses, are generally cam operated. The gripper pads are fixed on the cylinder and the gripper fingers are carried by an actuator shaft. The gripper fingers are moved toward and away from the gripper pads by the rotation of the actuator shaft. The actuator shaft is in turn rotated by the action of a cam follower in a fixed cam member. With this arrangement, the gripper fingers are alternately moved into a closed position abutting the fixed gripper pads and to an open position where the gripper fingers are moved away from the gripper pads. The grippers thus successively open and receive a sheet, close and grip the sheet, and open again to release the sheet. It has been the practice in the past to have one motion of the gripper fingers, i.e. open or closed, caused by the cam member while the other motion is caused by a spring or other torsion member.

There are two basic arrangements disclosed in the prior art. In one arrangement, the cam follower is located on one side of the gripper shaft and the spring on the other side. This arrangement is usually referred to as "forced opening." The cam urges the gripper fingers to an open position and the spring forces the fingers to a closed position when the cam is inactive. The above arrangement is described in U.S. Patents 2,411,123 and 2,846,947.

In the second arrangement referred to as "forced closing," the cam follower is located together with the spring on one side of the gripper shaft. The cam causes the grippers to close and the spring urges the grippers toward an open position. It has also been proposed, as indicated in Patent 2,846,947, in a forced opening arrangement to assist the spring by providing a second cam means to impart an additional force to the grippers in their closed position. In all of the above arrangements, the gripper mechanism is dependent on a resilient means to position the grippers.

In printing presses, the cam structure and the spring means are subjected to high centrifugal forces and substantial acceleration and deceleration forces. These forces are increased appreciably when the sheet transfer speed is increased. It is necessary, therefore, to over design these elements to compensate for the increase in the above described forces. The over design of the elements increases the mass of the elements which in turn contributes to the centrifugal forces and increases the problem of uniform acceleration and deceleration. There is a need, therefore, for a positively driven gripper mechanism that can operate effectively and efficiently at high transfer speeds without relying on the resilient properties of a spring.

For proper sheet transfer, it is also necessary to have the clamping force exerted by the grippers on the sheet exceed all of the other forces acting on the sheet during its transfer from one cylinder to another. It is necessary, therefore, to preload, by a controlled amount, the closing force of the gripper fingers against the gripper pads. In order to control the clamping force exerted by the grippers, the gripper fingers are usually connected by resilient means to the means rotated or driven by the cam and spring. The resilient means is arranged to provide an added force to the closing force exerted by either the cam or springs when the gripper fingers abut the gripper pads. This added force is obtained from the compression of the resilient means between the gripper fingers and the means driven by the cam or spring. Such resilient means are illustrated in U.S. Patents 2,928,344 and 3,007,408.

The above discussed pressure adjustment by the gripper fingers and the gripper pads is usually made by moving the cam follower to a position on the cam surface where the gripper fingers are closed. A gauge is then inserted between the cam and cam follower to open the grippers a preselected amount. The gripper fingers, by means of adjustment screws, are then moved into abutting relation with the gripper pads. After the gauge is removed, the gripper fingers in a closed position are further urged against the gripper pads by a resilient means connecting the gripper fingers to the lever means.

Access to the gripper mechanisms is difficult for adjusting purposes when the gripper mechanisms are in a normally closed position. There is a need, therefore, for an arrangement whereby the gripper fingers are easily accessible during the adjustment thereof to provide the desired clamping force previously discussed.

SUMMARY OF THE INVENTION

Briefly, the hereinafter described invention provides an adjustment means on the cam mechanism that permits the gripper mechanisms to be adjusted in an easily accessible position and further includes a positive drive cam arrangement that eliminates resilient devices for positioning a gripper mechanism.

Accordingly, the principal object of this invention is to provide a cam actuated gripper mechanism that is accessible for adjustment purposes.

Another object of this invention is to provide a cam actuated gripper mechanism that includes a positively driven cam follower and eliminates resilient means for opening or closing the gripper mechanism.

A still further object of this invention is to provide a cam member for actuating a gripper mechanism through a cam follower that has an adjustable surface for adjusting the closing force exerted by the gripper fingers on the gripper pads.

BRIEF DESCRIPTION OF THE DRAWINGS

In the drawings:

FIGURE 1 is a schematic view from the operating side of a sheet-feeding printing press illustrating the relative position of the gripper mechanisms on the various cylinders when they are in an open or closed position and the arrangement of the cylinders in the press making adjustment of certain gripper mechanisms difficult when the grippers are in an open position.

FIGURE 2 is a view partially in section illustrating the first transfer cylinder in elevation with the associated cam member and cam actuated gripper mechanisms.

FIGURE 3 is a view in section taken along the line 3—3 in FIGURE 2 illustrating the relation of the tip of the gripper finger and the gripper pad on the transfer cylinder.

FIGURE 4 is an enlarged view in section of the gripper body portion secured to the actuator shaft and the manner in which the gripper finger is resiliently secured to the gripper body portion.

FIGURE 5 is a top plan view of the gripper mechanism illustrated in FIGURE 4.

FIGURE 6 is an enlarged view of the cam member and cam follower illustrated in FIGURE 2.

DESCRIPTION OF THE PREFERRED EMBODIMENT

Figure 7:
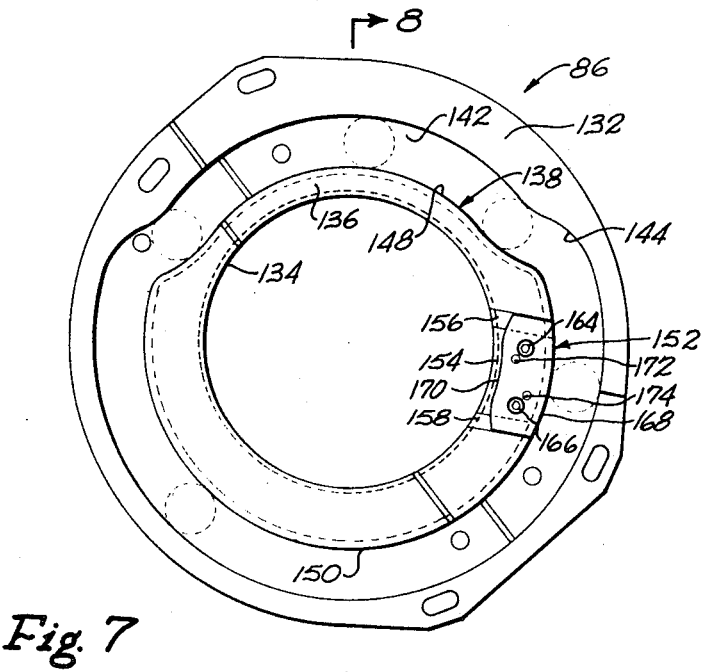
FIGURE 7 is a front elevational view of the cam member illustrated in FIGURES 2 and 6 with the adjustable segment in its normal position.

It should be understood that the following description of a sheet feeding perfecting printing press is for exemplary purposes only to illustrate the inaccessibility of the gripper mechanisms on certain of the cylinders while in a closed position and it is not intended to limit the invention to the described press. As will be apparent from the following description, the invention may be used with any cam actuated device that requires either initial or periodic adjustment.

Referring to the drawings and particularly to FIGURE 1, there is illustrated a schematic diagram of the various cylinders in a sheet feeding perfecting printing press similar to that illustrated in U.S. Patent 2,757,610 entitled "Sheet Handling Mechanism and Method for Multi-Color Perfector Press." The press comprises two printing units 10 and 12 repectively called the first printing unit and the second printing unit. It should be understood, however, that additional units may be arranged in tandem to provide multi-color printing on both faces of the sheet. For descriptive purposes, however, only two printing units are illustrated schematically.

There is a sheet feeding mechanism (not shown) that delivers sheets from a pile to a feed board 14 in succession and in timed relation with the speed of the press. For a better understanding of the manner in which the sheet is conveyed through the printing units 10 and 12, the various cylinders are labeled and each rotates in the direction of the arrow when viewed from the operating side of the printing press. The leading edge of the sheet is grasped by the grippers 16 on the pickup cylinder 18 and is delivered by the pickup cylinder 18 to the first impression cylinder 20. The leading edge of the sheet is grasped by the grippers 22 on the first impression cylinder 20 and is printed on one side while positioned on the first impression cylinder 20. The printing is accomplished in the conventional manner where inkers 24 transfer ink to the form on form cylinder 26 which in turn transfers the ink to the blanket on blanket cylinder 28. The sheet, printed on one side, is then delivered by the impression cylinder 20 at a tangent point t1 to the grippers 30 of first transfer cylinder 32. The first transfer cylinder delivers the sheet at tangent point t2 to the second transfer cylinder 34.

The second transfer cylinder 34 is of a diameter approximately two times the diameter of the first transfer cylinder and has two sets of grippers 36 and 38 at 180° from each other. The second transfer cylinder 34 delivers the sheet at tangent point t3 to the third transfer cylinder 40 where, dependent upon the adjustment, either the leading edge of the sheet is grasped by one set of grippers 42 or the trailing edge of the sheet is grasped by a second set of grippers 44.

As is described in U.S. Patent 2,757,610, the press can be adjusted so that the sheet can be printed in the second printing unit either on the same side as was printed in the first unit or on the other side. The press may, therefore, be adjusted to operate as a two color press or it may be adjusted to operate as a perfector press. FIGURE 1 illustrates the press adjusted to operate as a two color press. The two color grippers 42 on the third transfer cylinder 40 grasp the sheet and transfer the sheet to the second impression cylinder 46. The grippers 48 on second impression cylinder 46 grasp the leading edge of the sheet at tangent point t4 and the sheet is then printed with the second color as it contacts the blanket on blanket cylinder 50. The blanket is inked by the form on form cylinder 52 by inkers 54. The second impression cylinder 46 delivers the printed sheet to a sheet delivery cylinder 56 where it is grasped by grippers 58 at tangent point t5 and transferred to a receiver 60.

The grippers 30 on the first transfer cylinder 32 are closed between tangent points t1 and t2. Similarly, the grippers 22 on the first impression cylinder 20 are closed from the point where they grasp the leading edge of the sheet from the pickup cylinder 18 until they release the sheet at tangent point t1 to the first transfer cylinder 32. Similarly, the grippers 48 on second impression cylinder 46 are closed between tangent points t4 and t5. It will be apparent from the above that the grippers are closed through a substantial portion of the rotation of the first impression cylinder 20, the first transfer cylinder 32, the second impression cylinder 46 and the sheet delivery cylinder 56.

It is necessary to adjust and preload the gripper mechanisms on the above cylinders to provide the desired gripping force between the respective gripper fingers and gripper pads so that the leading edge of the sheet is firmly grasped and transferred on the respective cylinders. It has been the practice in the past to adjust the gripper fingers when the grippers are in an open position. As will be apparent with the first transfer cylinder 32, the blanket cylinder 28 and the second transfer cylinder 34 restrict access to the gripper mechanisms on the first transfer cylinder 32 when the gripper mechanisms are in an open position. The herein disclosed invention provides apparatus for adjusting the gripper mechanisms at a location where under normal operating conditions the gripper mechanisms are in a closed position. For example, the gripper mechanism 30 on the first transfer cylinder 32 is adjusted between the tangent points t1 and t2. The portion of the transfer cylinder 32 between tangent points t1 and t2 is far more accessible from the underside of the press to adjust the grippers 30. Reference hereinafter will be made to the first transfer cylinder 32 to illustrate how the grippers may be adjusted between the tangent points t1 and t2. It should be understood, however, that the other cylinders may include a similar type of adjustment means to permit adjustment of the gripper mechanisms in the same manner as on the first transfer cylinder 32.

Referring to FIGURES 2, 3 and 6, the first transfer cylinder 32 is illustrated in detail. The transfer cylinder 32 has a cylindrical body portion 62 with a planar portion 64 that supports the gripper mechanisms generally designated by the numeral 30. The transfer cylinder 32 has shaft end portions 66 and 68 rotatably supported in bearings 70 and 72 in the machine frame 74. A drive gear 76 is secured to the shaft end portion 68 and is arranged to rotate the first transfer cylinder 32 in the direction illustrated in FIGURE 1 in timed relation with the other cylinders in the printing unit.

The gripper mechanism 30 includes an actuator or rocker shaft 78 supported in journals 80 on the transfer cylinder 32. A lever 82 is connected to one end of shaft 78 and has a cam follower 84 positioned in a double grooved cam member generally designated by the numeral 86. The cam member 86 is in turn secured to the frame 74 and is arranged to actuate the cam follower 84 upon rotation of the first transfer cylinder 32 to rotate or rock the shaft 78.

The gripper mechanism 30 includes a plurality of individual grippers generally designated by the numeral 88 that have a body portion 90 secured to the rocker shaft 78 (FIGURES 4 and 5). The body portion 90 is generally U-shaped in transverse section and has parallel arms 92 and 94 and a closed end portion with a generally circular inner surface 96. The arm 92 has a threaded bore 98 therethrough and arm 94 has a bore 100 aligned with the threaded bore 98. The bore 100 has an enlarged portion 102 for receiving the head 104 of a screw 106. The rocker shaft 78 extends through the circular opening 96 in the body portion 90 and is secured thereto by the screw 106 urging the arms 92 and 94 toward each other and frictionally engaging the surface of shaft 78 to the inner circular surface 96 of gripper body portion 90. With this arrangement, the gripper body portion 90 can be rotated relative to the gripper shaft 78 by loosening screw 106 and spreading arms 92 and 94. As will be later described, the rotation of the gripper body portion 90 on rocker shaft 78 permits the gripper mechanisms 88 to be preloaded in a closed position.

The gripper body portion 90 has an outwardly extending arm portion 108 with a longitudinal slot 110 therethrough. A gripper finger 112 has a gripper end portion 114 and an oppositely extending base portion 116. The base portion 116 has an aperture 118 therethrough aligned with the longitudinal slot 110 in the gripper arm 108. A shaft 120 has an enlarged head portion 122 with a dimension greater than the slot 110 in arm 108. The shaft 120 is positioned in the finger base portion aperture 118 and a resilient spring 124 is positioned around the shaft 120. A spring retaining washer 126 is then suitably secured to the end portion of the shaft 120 to retain the spring 124 on shaft 120 between the finger base portion 116 and the spring retaining means 126. The shaft is positioned in the gripper arm slot 110 and the enlarged head portion abuts the underside of the arm 108 and retains the gripper finger 112 in the position illustrated in FIGURE 4 by compressing spring 124.

The first transfer cylinder surface 62 has a plurality of pads 128 secured thereto in underlying relation with the gripper finger end portions 114 and the edge of the sheet is grasped between the underside of the gripper finger edge portion 114 and the pads 128. By rotating the gripper body portion in a counterclockwise direction as viewed in FIGURES 3 and 4 and restraining the gripper finger 112 it is possible to preload the gripper mechanisms by compressing the spring 124. The gripper fingers 112 may thus be urged against the gripper pad 128 with a force equivalent to the compressive force of the spring 124. As previously stated, it is essential that the grippers be preloaded so that the force between the gripper finger and the gripper pad exceeds the other forces exerted by the cylinder during the transfer of the sheet. With the grippers preloaded the sheet remains firmly secured to the transfer cylinder while the grippers are closed and the sheet is being transferred.

Figure 8:
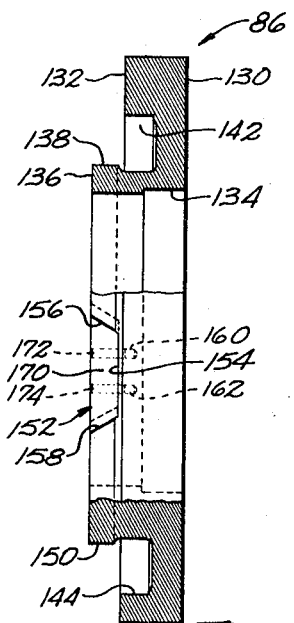
FIGURE 8 is a view in section taken along the line 8—8 in FIGURE 7 illustrating the two cam surfaces on the cam member.

Referring to FIGURES 6, 7 and 8, the cam actuator for the grippers 30 is illustrated in detail. The cam generally designated by the numeral 86 has a rear face 130, a front face 132 and a central aperture 134. There is an annular protuberance or shoulder 136 extending forwardly from the front face 132 that has a radial cam surface 138 on which the roller 140 of cam follower 84 rides during the rotation of the transfer cylinder 32. There is an annular groove 142 in the front surface 132 of cam 86 that has a second cam surface 144 on which a second roller 146 of cam follower 84 rides as the transfer cylinder 32 rotates. The configuration of the cam surface 144 is the same as the configuration of the cam surface 138 on protuberance 136. It should be noted, however, that the cam surface 138 is spaced radially inwardly from the cam surface 144 and the rollers 140 and 146 remain in abutting relation with the respective cam surfaces 138 and 144 throughout the complete revolution of the transfer cylinder 32. With this arrangement, the cam follower is positively actuated throughout the complete cycle of the transfer cylinder 32 and the gripper mechanisms 30 are not dependent on auxiliary spring means to return the gripper fingers to either an open or closed position. The positively driven cam followers, because of the double roller relation, are not subject to backlash at high printing speeds and positively position the gripper mechanism in either an open or a closed position during the operation of the printing unit.

The cam surface 138 has a profile with a radially inwardly extending surface portion 148 and a regular circular surface portion 150. When the roller 140 on cam follower 84 rides over surface 148, the shaft 78 is rotated to a position to open grippers 30. When the roller 140 rides over the regular circular surface portion 150 of cam surface 138, the grippers are in a closed position. It will thus be apparent by the profile of the cam surfaces 138 and 144 that the gripper mechanisms 30 are in a closed position throughout a substantial portion of each revolution of the first transfer cylinder. As previously stated in reference to FIGURE 1, the gripper mechanism 30 is in a closed position between the tangent points $t1$ and $t2$.

The cam mechanism 86 includes an insert generally designated by the numeral 152 on the protuberance 136 that is operable to modify or change the radial dimensions of cam surface 150 to that of cam surface 148 so that the gripper mechanisms will be in an open position when the insert element 152 is positioned with the cam surface similar to surface 148 extending radially outwardly therefrom. With this arrangement, the cam follower roller 140 will rock the shaft 78 to open the gripper mechanisms at a location between tangent points $t1$ and $t2$. The adjusting screws 106 on the gripper mechanism 88 are loosened and a gauge of preselected thickness is positioned between the gripper pad 128 and the gripper end portion 114. The gripper body portion is then rotated until there is a preselected spacing between the gripper pad 128 and the underside of the gripper end portion 114 substantially equal to the thickness of the gauge therebetween. All of the gripper mechanisms 88 on the shaft 78 are similarly adjusted so that they all have the same space between the pad 128 and gripper finger end portion 114. The adjusting screws 106 are then tightened to frictionally engage the gripper body portion to the shaft 78. Thus when the cam roller 140 is positioned on the regular surface 150 of cam surface 138, the grippers are closed and further are preloaded by the compression of spring 124 that retains the gripper finger 112 on the gripper body portion 90.

Figure 9:
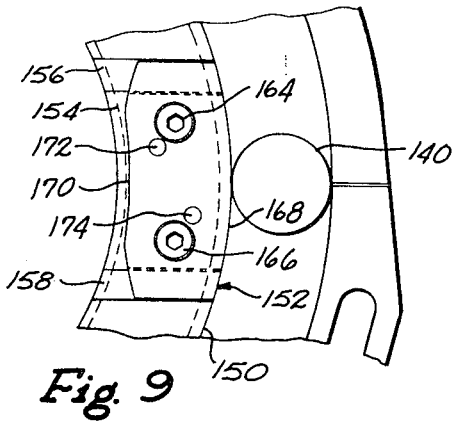
FIGURE 9 is an enlarged view of the adjustable segment in its normal operating position with a cam roller abutting the convex surface on the segment.
Figure 10:
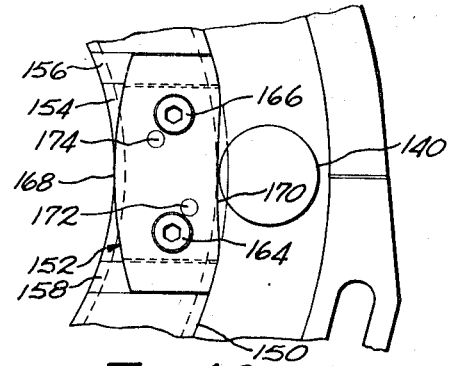
FIGURE 10 is a view similar ot FIGURE 9 with the adjustable segment in its adjusting position and the cam roller abutting the concave surface of the segment.

Referring to FIGURES 8, 9 and 10, the cam member protuberance 136 has a radial slot 154 with inclined side walls 156 and 158. The cam body portion has a pair of vertical bores 160 and 162 and suitable threaded apertures (not shown) for bolts 164 and 166 to secure the adjusting segment or insert 152 in the slot 154. The insert 152 has a longitudinal dimension substantially the same as the slot 154 and a first cam surface 168 that has the same curvature as the cam surface 150 and an opposite cam surface 170 that has a concave configuration. The insert 152 may be secured in the slot 154 with either surface 168 or 170 extending radially outwardly therefrom and forming a part of the cam surface 138. The insert 152 has a pair of pins 172 and 174 that are positioned in the bores 160 and 162. The pins 172 and 174 and the bores 160 and 162 are so arranged that the insert is in a fixed preselected position relative to the protuberance 136 when in either its normal position with surface 168 extending radially outwardly therefrom or in its adjusting position with the surface 170 extending radially outwardly therefrom. The insert 152 is changed from its normal position to its adjusting position by removing the bolts 164 and 166 and lifting the insert 152 with the pins 172 and 174 from the cam protuberance 136. The insert is then reversed and repositioned in the slot 154 with the pins 172 and 174 extending into the receiving bores in protuberance 136 and bolts 164 and 166 secure the insert in the adjusted position.

The insert 152 is normally positioned with the surface 168 extending radially outwardly as illustrated in FIGURE 9. The surface 168 is thus a continuation of surface 150 and the roller 140 retains the gripper mechanism 30 in the same position as it passes over surfaces 168 and 150. To adjust and preload the gripper mechanisms the insert 152 is removed from the slot 154 and reversed. The transfer cylinder 32 is then rotated until the cam follower roller 140 is in overlying relation with surface 170 on the adjusting mechanism 152. Movement of the cam roller radially inwardly on cam 86 because of the depression or recess in regular surface 150 by surface 170 causes the rocker shaft 78 to rotate and open the gripper mechanisms while the gripper mechanisms are between tangent points t1 and t2 where under normal operating conditions the gripper mechanisms are closed. In this position the adjusting screws 106 of each individual gripper device 88 is loosened and the body portion 90 is rotated on the rocker shaft 78 until the gripper end portion 114 is spaced a preselected distance from the gripper pad 128. This preselected distance is determined by a suitable feeler gauge. The adjusting screw 106 is then tightened to frictionally engage the gripper body portion 90 to the rocker shaft 78. The first transfer cylinder 32 is then rotated until the cam roller 140 is off surface 170 and preferably on surface 150. In this position the gripper mechanisms are closed and preloaded a preselected amount. The insert 152 is then removed from the slot 154 and reversed so that surface 168 extends radially outwardly and blends with surface 150 and the cam mechanism is now in position for normal operation wherein the gripper mechanisms in a closed position will be preloaded by compressing the spring 124 the preselected amount equivalent to the difference in distance between the gauge thickness and the open position of the grippers as controlled by surface 170.

According to the provisions of the patent statutes, I have explained the principle, preferred construction, and mode of operation of my invention and have illustrated and described what I now consider to represent its best embodiments. However, I desire to have it understood that, within the scope of the appended claims, the invention may be practiced otherwise than as specifically illustrated and described.

I claim:
1. A gripper mechanism for a sheet carrying member comprising:
   a rocker shaft rotatably mounted on said sheet carrying member,
   gripper fingers secured to said rocker shaft,
   gripper pads positioned on said sheet carrying member in underlying relation with said gripper fingers,
   lever means for rotating said rocker shaft and alternatively moving said gripper fingers into abutting relation with said gripper pads and away from said gripper pads,
   cam means for moving said gripper fingers in at least one direction relative to said gripper pads, said cam means including a cam follower connected to said lever operable to ride on a cam surface,
   first adjustment means to position said gripper fingers on said rocker shaft,
   said cam means including a cam member having a cam surface for said cam follower,
   said cam member having a movable portion that includes a segment on said cam surface, and
   said movable portion having a first position where said segment of said cam surface is tangent with said cam surface and forms a portion of said cam surface and a second position where said segment of said cam surface is divergent from said cam surface.

2. A gripper mechanism for a sheet carrying member as set forth in claim 1 in which said cam member movable member includes,
   a detachable segment having a first surface of substantially the same curvature as said cam surface and a second surface having a different curvature than said cam surface, and
   means to secure said detachable segment in said cam member with said first first surface tangent to said cam surface to form a continuation thereof and alternatively with said second surface forming a part of said cam surface and providing a deflection in the curvature of said cam surface.

3. A gripper mechanism for a sheet carrying member as set forth in claim 1 in which:
   said cam member includes a convex surface for rotating said lever means through said cam follower and moving said gripper fingers into abutting relation with said gripper pads,
   said cam member having a detachable segment with a first surface of substantially the same convex curvature as said cam surface and a second concave surface diverging in curvature from said convex cam surface,
   means to secure said detachable segment in said cam member with said first surface tangent to said cam surface so that said gripper fingers abut said gripper pads as said cam follower rides over said detachable segment first surface and alternatively with said second concave surface forming a part of said cam surface so that said gripper fingers are spaced from said gripper pads as said cam follower rides over said detachable segment second surface,
   said first adjusting means operable to move said gripper fingers toward said gripper pads while said cam follower abuts said detachable segment second surface to thereby increase the gripping pressure of said gripper fingers when said cam follower rides over said convex cam surface.

4. A gripper mechanism for a sheet carrying member comprising:
   a rocker shaft rotatably mounted on said sheet carrying member,
   gripper fingers secured to said rocker shaft,
   gripper pads positioned on said sheet carrying member in underlying relation with said gripper fingers,
   lever means for rotating said rocker shaft and alternatively moving said gripper fingers into abutting relation with said gripper pads and away from said gripper pads,
   said lever means being positively driven in both directions by cam means, and
   said cam means including two cam followers riding on separate individual cam surfaces.

5. A gripper mechanism for a sheet carrying member as set forth in claim 4 in which:

said cam means includes a cam member having a pair of annular cam surfaces of substantially the same curvature, one of said cam surfaces spaced radially inwardly of the other of said cam surfaces, one of said cam followers continuously abutting one of said cam surfaces and the other of said cam followers continuously abutting the other of said cam surfaces so that said lever means is positively driven and the position of said gripper fingers is controlled by said cam means.

6. A gripper mechanism for a sheet carrying member as set forth in claim 5 which includes:

resilient means connecting said gripper fingers to said rocker shaft, said resilient means operable to deflect as said gripper fingers are urged against said gripper pads by said cam means to thereby exert a predetermined gripping pressure on said gripper pads.

7. Apparatus for adjusting the gripping pressure of a gripping mechanism on a sheet carrying member comprising:

a rocker shaft rotatably supported on a sheet carrying member, a gripper mechanism having a body portion adjustably secured to said rocker shaft and a gripper finger extending radially therefrom, flexible means connecting said gripper finger to said gripper body portion, said sheet carrying member having a gripper pad positioned in underlying relation with the end portion of said gripper finger, a lever member connected at one end to said rocker shaft and having a cam follower other end, a cam member having an annular cam surface with a first cam surface portion and a second cam surface portion, said cam follower arranged to ride over said cam surface portions upon rotation of said sheet carrying member and periodically move said gripper finger into abutting relation with said gripper pad and away from said gripper pad a preselected distance, said gripper finger operable to be positioned in abutting relation with said gripper pad when said cam follower abuts said first cam surface portion, said cam member having a reversible segment with a first surface of the same configuration as said first cam surface portion and a second surface of a different configuration than said first cam surface portion, means to position said reversible segment with said second surface in abutting relation with said cam follower to thereby position said gripper fingers at a preselected distance from said gripper pads.

8. Apparatus for adjusting the gripping pressure of a gripping mechanism as set forth in claim 7 in which:

said cam member annular cam surface has a first substantially circular cam surface portion, said rocker shaft, lever member and cam follower arranged to maintain said gripper finger in abutting relation with said gripper pads while said cam follower rides over said substantially circular cam surface portion, said cam member having a reversible segment with a convex cam surface of substantially the same curvature as said substantially circular cam surface portion and a concave cam surface with a different curvature than said substantially circular cam surface portion, said reversible segment positionable with said concave cam surface forming a part of said cam surface and forming a recessed portion in said first cam surface, said gripper finger spaced from said gripper pad when said cam follower abuts said concave cam surface on said reversible segment, said gripper mechanism arranged to be adjusted while said cam follower abuts said concave cam surface of said reversible segment to move said gripper fingers toward said gripper pad and thereby increase the gripping pressure of said gripper finger as said gripper finger as said cam follower rides over substantially circular cam surface portion.

9. Apparatus for adjusting the gripping pressure of a gripping mechanism as set forth in claim 7 which includes:

a second annular cam surface of substantially the same configuration and a radial dimension more than said other annular cam surface, said second annular cam surface positioned coaxially with said other annular cam surface, a cam follower including a pair of rollers, one of said rollers arranged to continuously abut and ride over said first named cam surface and the other of said rollers arranged to abut and ride over said second named cam surface so that said gripper finger is positively driven by said cam member alternatively toward and away from said gripper pad.

10. A cam member having an adjustable cam surface comprising:

a cam member body portion having a front face, an annular recessed portion in said front face having an annular cam surface, an annular shoulder extending forwardly from said front face, said shoulder having an annular cam surface thereon, said shoulder portion having a reversible insert member detachably secured thereto, said insert member having a first convex cam surface with a curvature substantially the same as said cam surface and a concave cam surface with a curvature that deviates from the curvature of said cam surface, and means to alternatively position said insert member in said shoulder portion with said convex surface forming a part of said cam surface and with said concave surface forming a part of said cam surface.

References Cited

UNITED STATES PATENTS

| 868,086 | 9/1907 | Montstream | 74—568 |
| 2,411,123 | 11/1946 | Wood | 101—408 |
| 2,846,947 | 8/1958 | Rodenhausen | 101—409 |

RICHARD E. AEGERTER, *Primary Examiner.*